United States Patent [19]

Ytterström

[11] 4,222,810
[45] Sep. 16, 1980

[54] APPARATUS FOR APPLYING A BAND OF MATERIAL TO THE SIDE OF A CIRCULAR BODY OF REVOLUTION

[75] Inventor: Gunnar E. Ytterström, Alingsås, Sweden

[73] Assignee: Aktiebolaget Stabil Mekaniska Verkstad, Alingsås, Sweden

[21] Appl. No.: 890,311

[22] Filed: Mar. 27, 1978

[30] Foreign Application Priority Data

Apr. 5, 1977 [SE] Sweden .............................. 7703984

[51] Int. Cl.² ............................................ B29H 17/10
[52] U.S. Cl. ................................ 156/405 R; 156/421; 156/447; 156/475; 156/487
[58] Field of Search .................. 156/110 R, 116, 394, 156/396, 405, 406, 421, 487, 488, 446, 447, 468, 475, 481

[56] References Cited

U.S. PATENT DOCUMENTS

| | | | |
|---|---|---|---|
| 1,179,528 | 4/1916 | Kaufmann | 156/421 |
| 1,327,910 | 1/1920 | Harsel | 156/405 |
| 2,773,617 | 12/1956 | Weiss | 156/487 X |
| 3,413,174 | 11/1968 | Porter | 156/406 |
| 3,427,215 | 2/1969 | Crocker | 156/116 |
| 3,595,724 | 7/1971 | Leblond | 156/175 |
| 3,852,142 | 12/1974 | Leblond et al. | 156/405 |
| 3,944,457 | 3/1976 | Podvin et al. | 156/405 |
| 4,019,945 | 4/1977 | Look et al. | 156/405 |
| 4,095,731 | 6/1978 | Harding | 226/3 |

Primary Examiner—John E. Kittle

Attorney, Agent, or Firm—Larson, Taylor and Hinds

[57] ABSTRACT

Apparatus for application of a band of material onto the side of a circular body of revolution such as a tire. The apparatus includes a rotatable carrier for the body, means for rotating the body on the carrier and band application means adjacent the carrier. The band application means includes means for supplying a continuous band of material in the form of a two layer band which is made up of a first band of material for application to the side of the body and a protective foil covering a surface of the band. Guide means are provided to guide the two layer band from the supply means to the body for application of the first band onto a side of the body, and means are provided for pressing the first band onto the side of the body while the body is rotating. The band application means further includes means for cutting off the first band after application of the first band of material to the side of a body, and the guide means includes a guide member for the two layer band positioned close to the location where the first band is applied to the side of the body and around which guide member the protective foil is drawn. The apparatus further includes driven roller means for positively engaging the protective foil to separate the protective foil from the first band and to provide a feeding of the two layer band from the supply means for application to the body. The means for pressing the first band onto the side of the body comprises a resilient roller which is freely rotatable.

8 Claims, 8 Drawing Figures

APPARATUS FOR APPLYING A BAND OF MATERIAL TO THE SIDE OF A CIRCULAR BODY OF REVOLUTION

The present invention relates to apparatus for application of a band-formed material to the sides of a rotatable symmetrical object, and more particularly to apparatus for application of a rubber band to the sides of a vehicle tire, which apparatus comprises a holder for the rotatable object and an application machine on each side thereof.

The invention can be used for many different fields for application of a band formed material on the sides of a disc formed or ring formed body adjacent the outer periphery thereof, but for the sake of simplicity the invention will be described in the following mainly with reference to a machine for application of a rubber band on the sides of a vehicle tire.

The application of a band-formed material on the sides of a circular disc-formed or ring-formed body adjacent the outer periphery thereof previously used to be made by hand mainly because of the need to have the band follow as closely as possible the outer periphery of the circular rotatable body without having the band fold onto itself. The bands are supplied as plain straight bands and, during application, the bands become stretched at the edge corresponding to the outer periphery of the rotatable body. Therefore, there is a substantial risk that the band folds onto itself at the inner edge or that the band tends to creep radially inwards from the outer periphery of the body. In many cases it is also essential that the band, after application, is cut edge to edge so as to avoid an interfering overlap edge or so that there is no space between said edges.

The manual application of the bands is time consuming and requires a highly skilled operator. Therefore, there has been a need for a machine which will perform the task, by which the application and the cutting of the band is made more precisely than what is usually possible when applying the bands by hand, and, most importantly, in which the application is made more quickly and can be performed without the need of especially skilled persons.

Thus the invention relates to a machine of the type mentioned above and especially a machine for application of rubber bands on the sides of vehicle tires and comprising a rotatable carrier for the vehicle tire and an application machine provided on each side of the tire which is mounted in said carrier.

Further characteristics of the invention will be evident from the following detailed specification and the appended claims.

The invention will now be described more in detail with reference to the accompanying drawings, in which FIG. 1 is a front view of an apparatus according to the invention partly in section.

Figure 8:
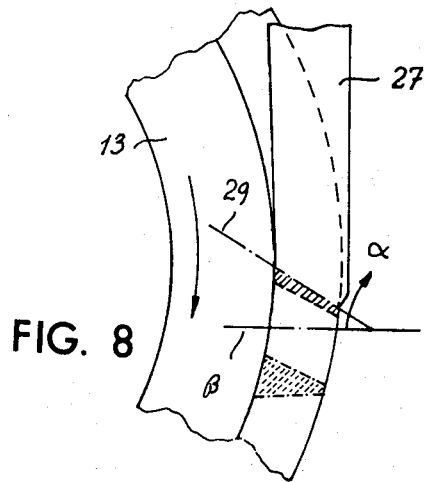

FIG. 8 diagrammatically illustrates a portion of a tire after the side band application is finished.

The apparatus illustrated in the drawings is formed as an integral unit mounted in a support and comprising a rotatable carrier 1 for the circular body of revolution and on each side of said carrier an application machine 2,3, which machines are identical but mirror symmetrical and operate parallelly to each other so that side bands can be applied to both sides of the tire at the same time.

Figure 1:
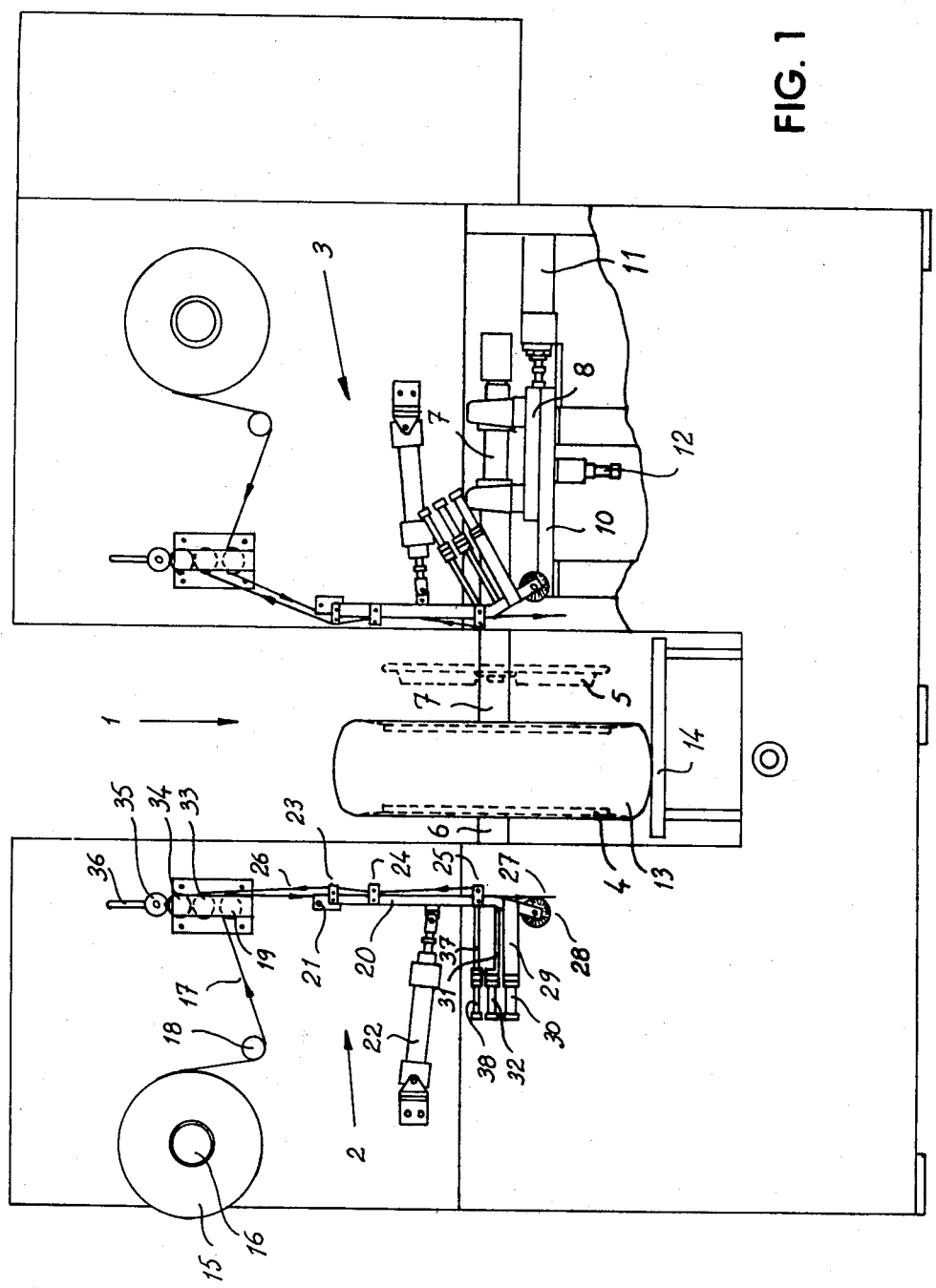
Figure 3:
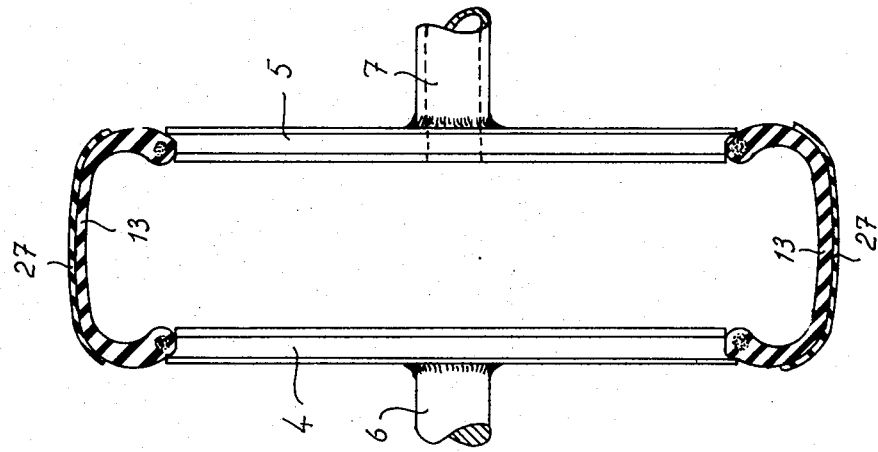
FIG. 3 is a fragmentary cross-sectional view of a tire which is about to be side-covered in the apparatus according to the invention.
Figure 2:
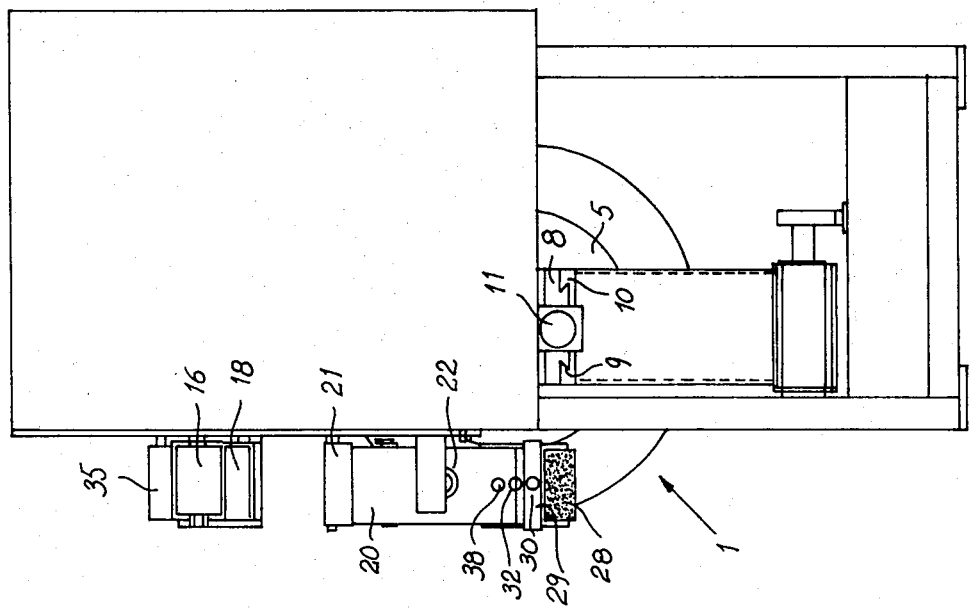
FIG. 2 is a side view of the apparatus of FIG. 1.
Figure 4:
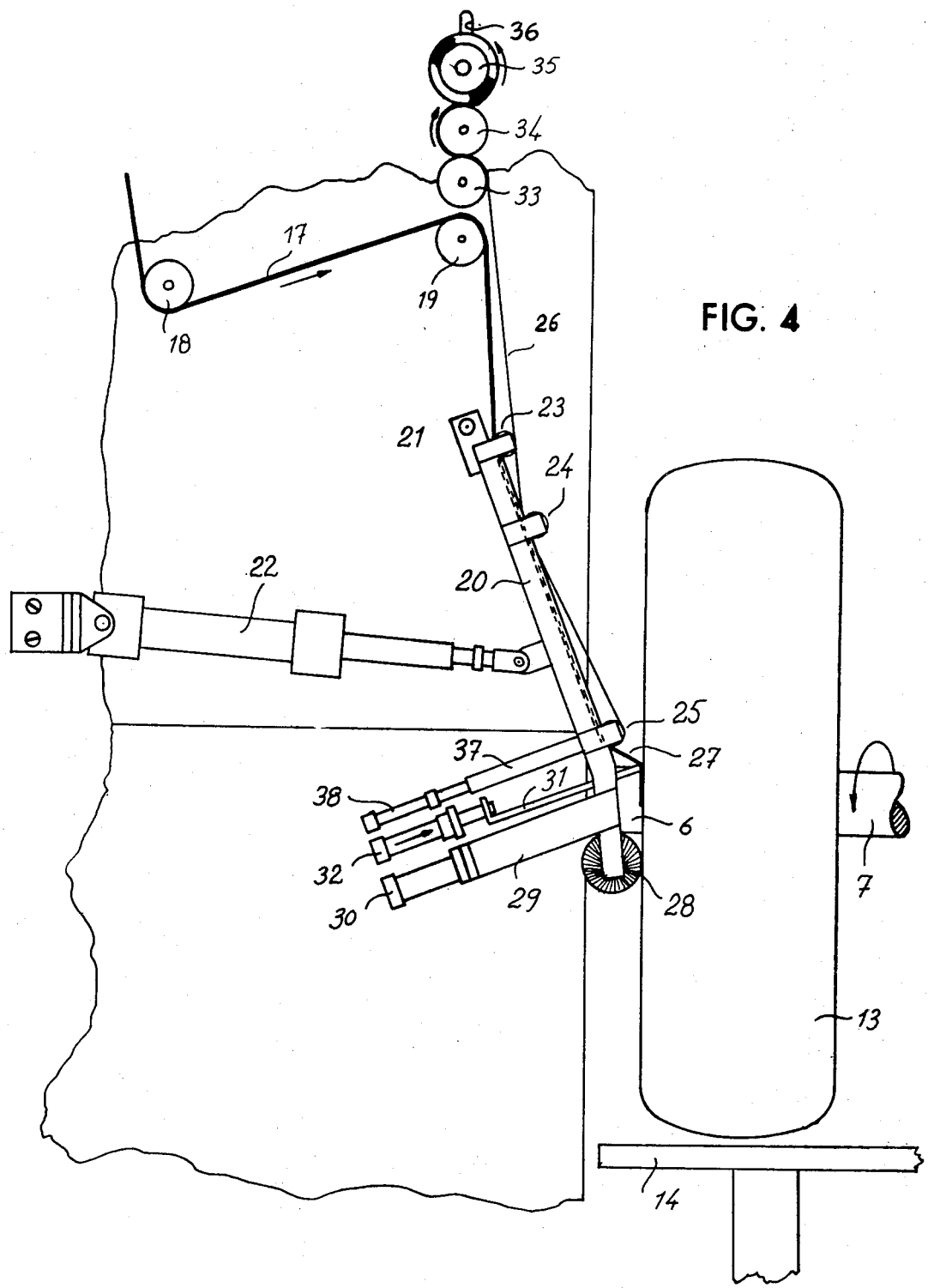
FIG. 4 illustrates a portion of the apparatus according to the invention at an introductory phase of the side application, and FIG. 5 similarly illustrates the final phase of the application.
Figure 5:
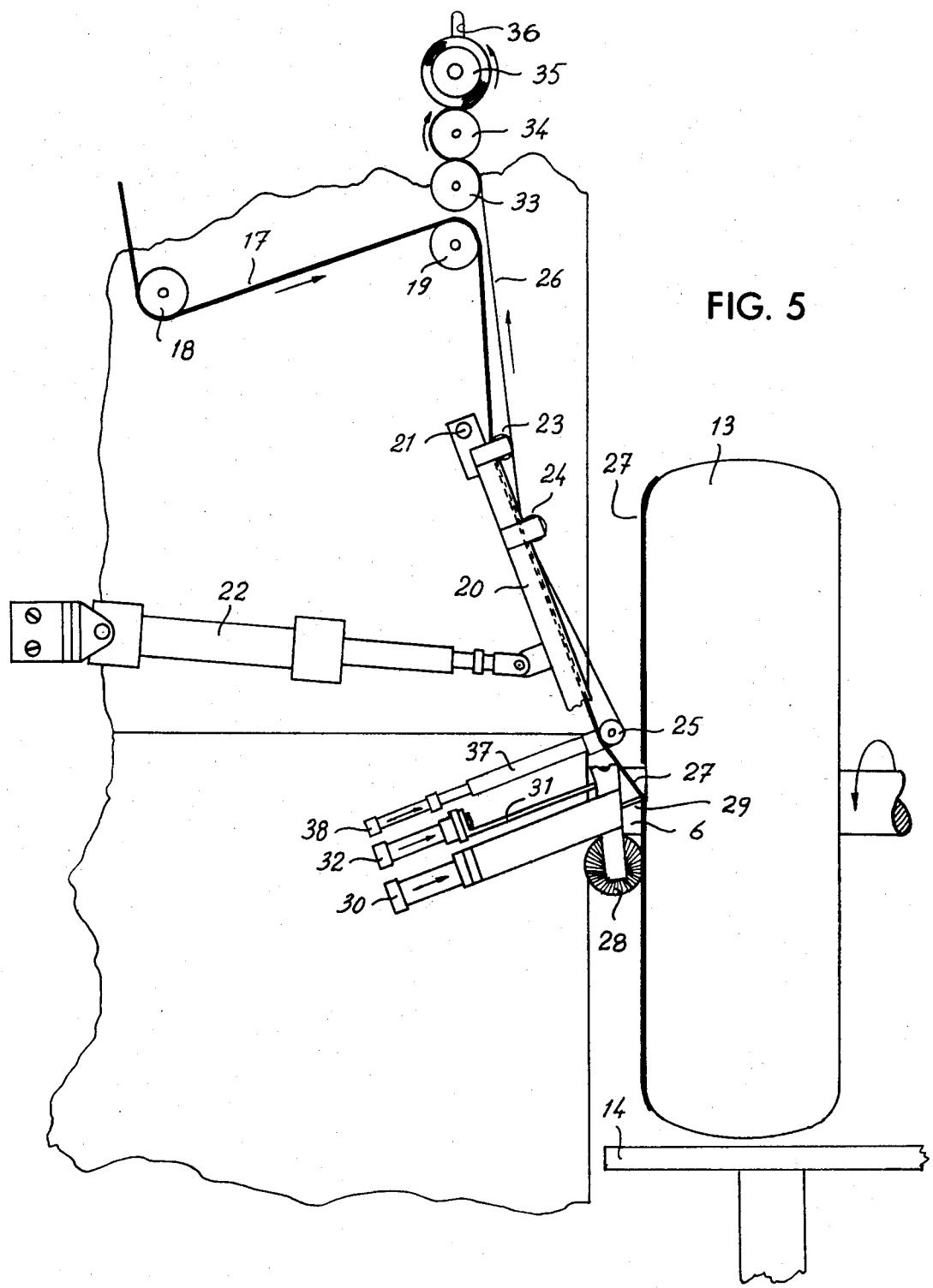

The rotatable carrier comprises two tire holder shields 4,5 each mounted on a shaft 6,7. The shaft is rotatable by an electrical motor (not shown). The left tire holder shield 4 as illustrated in the drawings is fixedly mounted on the shaft 6, and the right hand shield 5 is fixedly mounted on the shaft 7. The shield 5 is axially movable in that the shaft 7 is axially movable in relation to the shaft 6, and the shaft 7 is fixedly mounted on a slide 8 which by a dovetail guide 9 is guided on a portion 10 of the support and which can be moved by means of an hydraulic or pneumatic cylinder 11. The slide 8 can be locked in at least two axial positions by means of a stop pin 12, which, from underneath, locks the slide 8 in relation to the support portion 10. The tire holder shields 4 and 5 are preferably exchangeable in order to make it possible to mount tires 13 of different size. To facilitate the mounting of the tire, a vertically adjustable roll path 14 is provided under the tire carrier, on which the tire can be rolled in and on which the tire is supported when being mounted on the tire holder shields. The application machines 2 and 3 are as mentioned identical but mirror symmetrical and therefore only the left hand application machine 2 as illustrated in FIG. 1 will be described.

The application machine 2 is mounted on a vertical side of the machine support and it comprises a supply roll 15 of rubber band which is rolled together with a protective foil of plastic or similar material and which is mounted on an uncoil shaft 16. The band 17 comprising the rubber band and the protective foil extends over a pulley 18 provided somewhat under and aside of the band supply roll 15 and over a second pulley 19 provided above a guide for the band which leads to the actual application means. The guide for the band and the application means are mounted on a feeder arm 20 which is rotatably mounted in a vertical plane about a pin 21. Feeder arm 20 can be rotated by actuation of a pneumatic or hydraulic cylinder-piston unit 22 having a cylinder portion mounted on the support and having a piston portion connected to the feeder arm 20. The feeder arm 20 is U-formed in cross-section, and the branches of the U-formed profile provide a guide for the band 17 while it is moved down through the feeder arm and applied to the tire side. Between the branches of the U-profile of the feeder arm, three pulleys 23, 24 and 25 are mounted, and the two layer band is guided by pulleys 23 and 25 underneath all three pulleys and is kept in said position between the branches of the profile. The lowermost pulley 25 of the three pulleys also provides a return pulley for the protective foil 26 of the band 17 which is separated at pulley 25 from the band 17, so that the rubber band 27 is made free for being applied to the tire side with a clean, preferably pretreated surface thereof.

At the lower end of the feeder arm 20, a roller or cylindrical brush 28 is mounted which is intended to press the rubber band 27 to stick to the tire side while the tire 13 rotates. For cutting the rubber band there is provided a knife 29 which can be of the purely mechanical kind or which can be a heating wire which melts the rubber band 27. The knife is connected to a cylinder-piston unit 30, which, when actuated, pushes the knife outwards into contact with the rubber band. In its normal position, the knife is kept retracted from the rubber band. Above the knife 29 there is an applier 31 for applying the rubber band 27 to the side of the tire. Applier 31 is actuatable by means of a cylinder-piston unit 32 which has for its purpose to momentarily press a small portion of the descending end of the rubber band 27 for adhesion to the tire side just before the application of the side band starts and the tire begins to rotate. In its normal position, applier 31 is kept retracted from the rubber band. In order to prevent the rubber band from moving during the cutting apart thereof and the subsequent final pressing of the rubber band to the tire side, a retainer 37 is provided above the applier 31. The retainer 37 is mounted adjacent to the lowermost pulley 25 and it is actuatable by means of a cylinder-piston unit 38 so that it presses the rubber band with the protective foil onto the pulley 25 when the said cylinder-piston unit 38 is extended.

The protective foil 26 which is removed from the rubber band at the pulley 25 is bent out from the rubber band 27 and round the pulley 25 and extends under the pulley 24 over the pulley 23 and up to a winding device which is mounted above second pulley 19 mentioned above. The winding device includes two rollers 33 and 34 which are driven by a motor (not shown) and a winding roller 35 which is likewise driven by a motor (not shown). The protective foil 26 is fed between the two drive rollers 33 and 34 and is thereafter pulled between the drive roller 34 and the winding roller 35, whereby the protective foil 26 is wound up on the winding roller 35. For this purpose, the said roller 35 is displaceable vertically in relation to the drive rollers 33 and 34 and it is guided in a vertical slot 36. The drive rollers 33 and 34 provide or contribute to the feeding of the band 17, and since the said rollers only act on the protective foil 26, the form and size of the rubber band is not changed by the said feeding.

The apparatus works as follows: A tire is rolled into position on the roller path 14 and the roller path is adjusted in the vertical direction so that the tire 13 comes into position straight behind the shaft 6, whereupon a cylinder 11 for the movable tire holder shield 5 is actuted so that the tire is clamped between the fixed shield 4 and the movable shield 5. The stop pin 12 is raised and the tire 13 is slightly inflated, for instance to 0.2-0.4 kg/cm², whereupon the movable tire holder shield 5 with the shaft 7 and the slide 8 move back some distance until slide 8 is stopped and locked at the stop pin 12. Then the cylinders 22 of the feeder arms 20 are pressurized so that the feeder arms are moved out towards the tire until the brushes 28 come into contact with the tire sides. It is presupposed that the feeder arms 20 are adjusted and mounted so that the brushes 28 contact the intended portion of the tire. After the rubber band 27 is cut during a preceding side band application, a small piece of rubber band 27 hangs freely down under the pulley 25 but not as far as to the brush 28. At this stage, the rubber band 27 and the protective foil 26 are kept pressed onto the pulley 25 by the retainer 37. In order to start the pressing of the rubber band 27 to the tire side, cylinder 32 of the applier 31 is actuated and the applier 31 is extended to the tire 13 thereby pressing the free hanging portion of the rubber band 27 to the tire. Immediately after the rubber band is pressed to stick to the tire, applier 31 returns to its initial position, and concurrently therewith also the retainer 37 returns to its initial position. The motor for feeding the rubber band 27 and the protective foil 26 start at the same time as the motor starts for rotating the tire 13, and the tire rotates approximately one turn whereupon the two motors are stopped. The cylinder 38 is then actuated so that the retainer 37 is extended and presses the rubber band onto the pulley 25 to prevent a further pulling out of the rubber band. The knife 29 is moved to the tire side by the actuation of the cylinder 30, and after the rubber band 27 is cut off, knife 29 returns to its initial position. Where knife 29 is a heated knife, it returns to its initial position after a predetermined lapse of time. The tire is further rotated some distance to press the cut off end of the rubber band 27 onto the tire which end has not yet been fixed to the tire, and when the band is fixed to the tire side, the tire rotating motor is stipped and the feeder arms 20 return to their initial positions from their positions at the tire sides. The air of the tire is evacuated, the stop pin 12 is released and the cylinder 11 pulls the movable tire holder shield 5 back, the roll path 14 is raised to a desired position, and the side-coated tire is rolled off for additional treatment such as vulcaniation etc. The rubber band 17 is kept pressed and locked to the pulley 25 until the application of rubber band is started for the next tire in that the applier 31 is extended to press the descending free end of the rubber band 27 fixed to the tire side.

Normally the above described apparatus works satisfactorily, but it may in some situations happen that the single press roller 28 cannot provide a sufficient pressing of the application band to the tire side and that air spaces or air bubbles may be enclosed between the tire side and the application band. Moreover, the press roller is provided substantially parallel to the plane of rotation which may in some cases make the pressing of the band difficult especially at the edge thereof located at the tread surface of the tire. Therefore the applier 31 may be substituted by a roller of substantially the same type as the press roller 28 and, in that event, the said application roller is allowed to contact the tire side during the entire application operation so that the band is pressed by two rollers, one after the other.

The knife 29 for cutting the band in the embodiment illustrated in FIGS. 1-5 of the drawings is provided substantially radial to the rotation axis of the tire. This has shown to be disadvantageous in some respects, due to the fact that the plane and straight line application band has to be applied substantially along a circle around the tire. In order to avoid wrinkles at the inner edge of the band, the outer edge thereof has to be stretched, and the said stretching is distributed over the length of the band. When the band is thereafter cut off, it substantially regains its unstretched form, in which the cut off edge, which at the moment when the band was cut off extended at right angle to the band direction, forms an angle to the band direction with the angle tip at the inner edge of the band when the band resiliently regains its initial form. Therefore a triangular overlap is obtained during the band application which may make the final treatment of the tire difficult.

Therefore the knife for cutting off the application band by direct contact with the tire can be mounted obliquely so that the knife cuts the band at an angle of 15°–30° with the angle tip located at the outer edge of the band. Thus it is possible to get a nearly complete overlap edge and the necessary overlapping can thereby be minimized.

In the embodiment according to FIGS. 1–5, the different parts of the application means are mounted adjacent the outer end of the rotatable feed arm 20. By the rotating movement of said feeder arm, some problems may arise during application of the band and when adjusting the apparatus for different tire sizes. Therefore, the different application means can be mounted stationarily or on a carriage which is movable parallel to the rotation axis of the tire. Thereby the different parts of the application means always take the same position independently of different types and sizes of tire. On the carriage, the said different parts can be easily adjusted for different tire sizes.

In an alternative embodiment of the invention, the apparatus is also provided with means for correct location of the tire in the vertical direction and also in the horizontal direction in relation to the application machines and for facilitating the side displacement of the tire from the position in which the tire is moved into the machine to a position in which the tire is fixedly mounted between the rotatable shields 4 and 5 of the apparatus.

Figure 6:
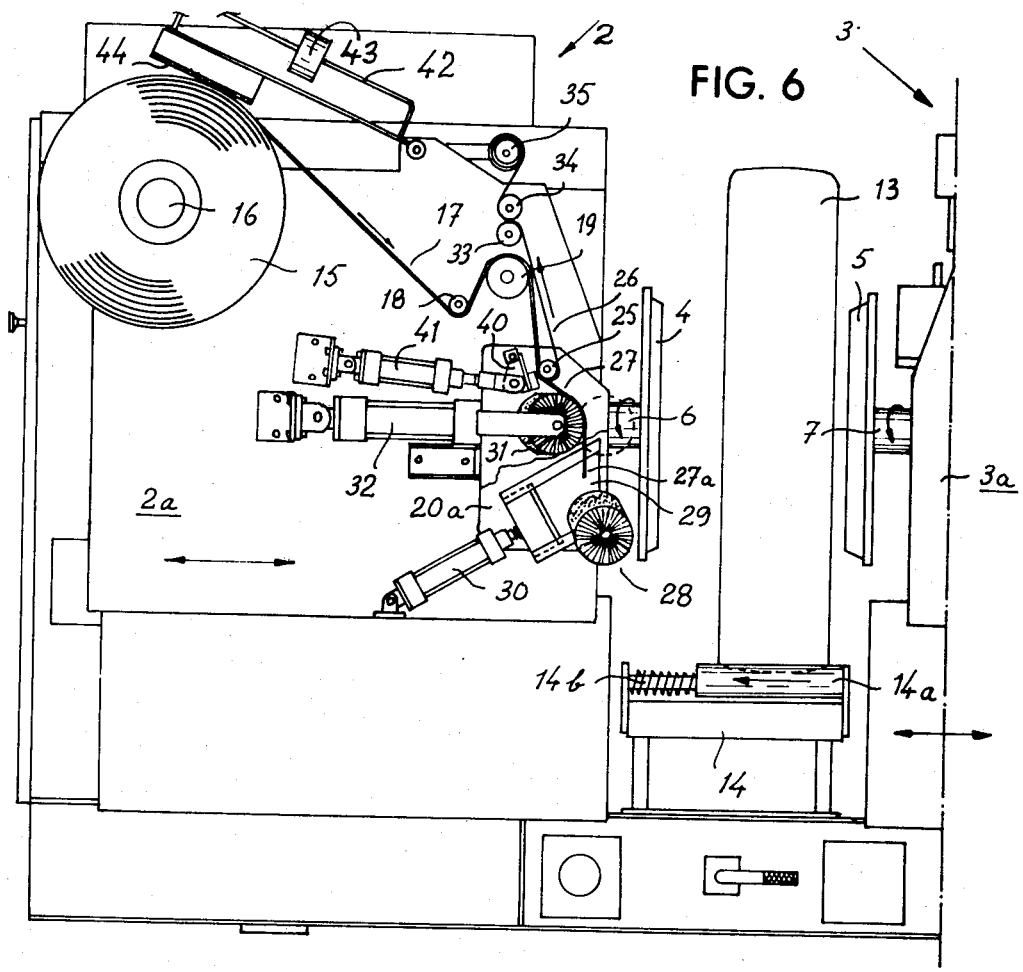
FIG. 6 is a vertical view of one half of a modified apparatus according to the invention.

In the apparatus illustrated in FIG. 6, the roll path 14 which is adjustable in the vertical direction comprises two support rollers 14a which support the tire and which are displaceable in the horizontal direction on shafts 14b and which are spring biassed in a direction away from the fixed tire shield 4. When the movable tire shield 5 is extended, the tire 13 may thereby easily be moved into the fixed tire shield 4 while resting on the support rollers 14a. Preferably, the entire application machine 2 is mounted on a horizontally displaceable part 2a so that the application machine can be moved to and from a tire which is mounted between the shields 4 and 5, and similarly the second application machine 3 is mounted on a horizontally displaceable part 3a of the second half of the apparatus.

The guide for the application band 17 which is uncoiled from the supply roll 15 and the application means are mounted on a holder 20a which can be fixedly mounted or displaceable along the vertical side of the application machine 2. At the lower part of the holder 20a, a press roller in the form of a brush roller 28 is mounted for pressing the rubber band 27 to the tire side while the tire 13 rotates. The knife 29 has a sharp edge and is preferably heated so as to cut the rubber band 27 under heat and by direct contact with the tire side which is made by the actuation of the cylinder 30 which extends the knife. In its normal position, knife 29 is kept retracted from the rubber band 27. As best evident from FIG. 8, knife 29 is mounted at an angle α which differs from the radial direction β by 15°–30°. Depending on the location of the knife 29 and the rotating direction of the tire 13, the angle α is calculated so that the rubber band 27 is cut off with the tip at the outer edge of the rubber band.

Above the knife 29 there is an applier which is formed as a brush roller 31 and which is actuatable by the cylinder 32 and the purpose of which is to press the descending cut off part 27a of the rubber band to the tire side before the application of the band starts and before the tire begins to rotate. In its initial position, application roller 31 is retracted as illustrated in full lines and in its extended position the brush roller 31 is in contact with the tire side as illustrated in dotted lines. The brush roller 31 is both a press roller for the rubber band 27 and a retainer to prevent the rubber band from moving when the rubber band is cut off and is subsequently finally pressed fixed to the tire side. The protective foil 26 which is removed from the rubber band 27 at the pulley 25 is pulled upwards and is fed between the two drive rollers 33 and 34 and is wound on a driven winding roller 35.

Figure 7:
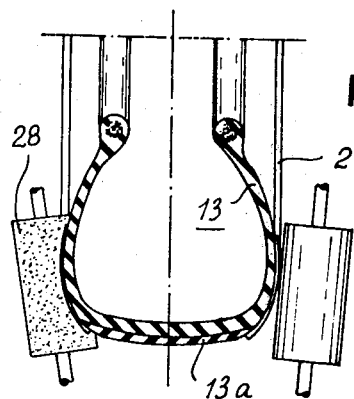
FIG. 7 is a cross-section through a tire during the pressing of the side band onto the tire, whereby the left hand half of the figure illustrates the apparatus according to the invention and the right hand half illustrates a conventional apparatus.

Since both press rollers 28 and 31 are formed as brush rollers, they follow the form of the tire in a favourable way and the rubber band 27 is very well pressed to the tire even at the edge thereof which is located at the tread surface and which somewhat overlaps the layer 13a which was previously applied as a new tread surface of the tire. In the previously known apparatus having stiff press rollers as illustrated in the right hand part of FIG. 7, there is an imperfect pressing of the rubber band to the tire side, especially at the outer periphery of the band 27. The brush rollers 28 and 31 substantially solve this problem, but in order to further improve the pressing of the application band 27 at the tread surface 13a, the brush rollers 28 and 31 are mounted somewhat obliquely as illustrated in FIG. 7.

To prevent unintentional pulling out of the rubber band when the application of the band has just started and when the rubber band is cut off, there is provided a rotatable retainer 40 which is actuatable by a cylinder-piston unit 41 and which, when extended, rotates the retainer 40 which thereby presses the band 17 to the pulley 25 thereby preventing unintentional pulling out of the band 17. Such retaining of the rubber band is necessary to obtain the smallest possible overlap of the band on the tire.

In order to get a desired band tension, the apparatus also includes a band brake in the form of a rotatable brake arm 42 having an adjustable weight 43 and a friction cover 44 which engages the outer periphery of the band roller 15.

The apparatus illustrated in FIGS. 6–8 works as follows:

The roll path 14 is adjusted to correct position in the vertical direction and in the longitudinal direction in relation to the tire holder shields 4 and 5 considering the actual tire size, and a tire is rolled in and is placed on the support rollers 14a. The tire 13 is thus located just in front of the tire holder shields and the right hand shield 5 (as illustrated in FIG. 6) is extended, thereby pressing the tire 13 towards the left hand shield 4 while the tire 13, together with the support rollers 14a, slide on the spring biassed shafts 14b. The tire is thereby clamped between the fixed shield 4 and the axially movable shield 5, and the tire is inflated with air, up to a pressure of for instance 2 kg/cm². During the inflation, the movable tire holder shield 5 moves slightly backwards so that the tire takes substantially the same form as when mounted on a wheel rim. It is presupposed that the holder 20a with the brush roller 28 is adjusted to such position that the brush roller 28 now contacts the tire side with intended pressure. Thereafter, cylinder 32 is actuated and the depending free edge 27a of the rubber band 27 is, by the application roller 31, moved out into contact with the tire side. Preferably the rubber band and/or the tire side are pretreated so that the application band 27 sticks to the tire side. Retainer 40 in this phase is retracted and the application now can start which is made in that the shafts 6 and 7 of the shields 4 and 5 respectively are brought to rotate thereby rotating the tire 13 at the same time as drive rolls 33 and 34 and winding roll 35 begin to rotate. During the said rotation, first the brush roller 31, and thereafter the brush roller 28, press the application band 27 against the tire side, and when the tire has rotated slightly more than 360°, the apparatus is stopped, retainer 40 is actuated by cylinder 41, and the knife 29 is extended by means of cylinder 30 to cut off the rubber band 27 close to the tire side. The brush roller 31 thereafter returns to its retracted initial position and the tire is further rotated some distance so that the non-fixed end of the band is fixed to the tire side by the actuation of the brush roller 28. The air is evacuated from the tire, axially movable tire holder shield 5 is retracted, and the side covered tire is rolled off for additional treatment such as vulcanization etc. A new tire is then rolled into the machine and the operation is repeated as described above.

It is to be understood that the above specification and the embodiments illustrated in the drawings are only illustrating examples and that all kinds of modifications may be presented within the scope of the appended claims.

What is claimed is:

1. Apparatus for application of band of material onto the side of a circular body of revolution, comprising: a rotatable carrier for said body; means for rotating a body on said carrier; band applciation means adjacent said carrier, said band application means comrising means for supplying a continuous band of material in the form of a two layer band comprising a first band of material for application to the side of said body and a protective foil covering a surface of said band, means for guiding said two layer band from said supply means to said body and a protective foil covering a surface of said band, means for guiding said two layer band from said supply means to said body for application of said first band onto a side of said body, means for pressing said first band onto the side of said body while said body is rotating and means for cutting off said first band after application of said first band of material to the side of a body, said guide means comprising a guide member for said two layer band positioned close to the location where said first band is applied to the side of said body and around which guide member the protective foil is drawn; and driven roller means for postively engaging the protective foil to separate said protective foil from said first band and to provide a feeding of the two layer band from said supply means for application to said body, said means for pressing said first band onto the side of said body comprising a first freely rotatable brush roller and a second, freely rotatable brush roller, and means for mounting each of said first and second rollers at an angle to the plane of rotation of said rotatable carrier and such that an extension of the axis of each of the rollers will intersect an extension of the axis of rotation of said rotatable carrier.

2. Apparatus according to claim 1 wherein said guiding means, said pressing means and said cutting means are mounted on a common support movable towards and away from the side of said body.

3. Apparatus according to claim 1 wherein said band application device further comprises an application member for applying a free hanging end of said first band to the side of said body, said free hanging end appearing adjacent said guide member.

4. Apparatus according to claim 3 wherein said cutting means is located between said application member and said resilient roller.

5. Apparatus according to claim 4 wherein said cutting means comprises a heated member.

6. Apparatus according to claim 5 wherein said heated member comprises a knife blade.

7. Apparatus according to claim 1 further comprising retaining means for holding the two-layer band against said guide member to prevent a further feeding of the two-layer band from said supply means during actuation of said cutting means.

8. Apparatus according to claim 1 wherein said means for cutting off said first band comprises knife means, disposed between the first and second brush rollers, for cutting the band at a location at least adjacent to the side of the circular body of revolution, and means for mounting said knife means at an angle with respect to the plane of rotation of the rotatable carrier and such that an extension the axis thereof will intersect an extension of the axis of rotation of said rotatable carrier.

* * * * *